No. 676,564. Patented June 18, 1901.
O. LEDOVSKY.
PIPE COUPLING.
(Application filed Jan. 16, 1901.)
(No Model.) 2 Sheets—Sheet 1.
Fig. 1.
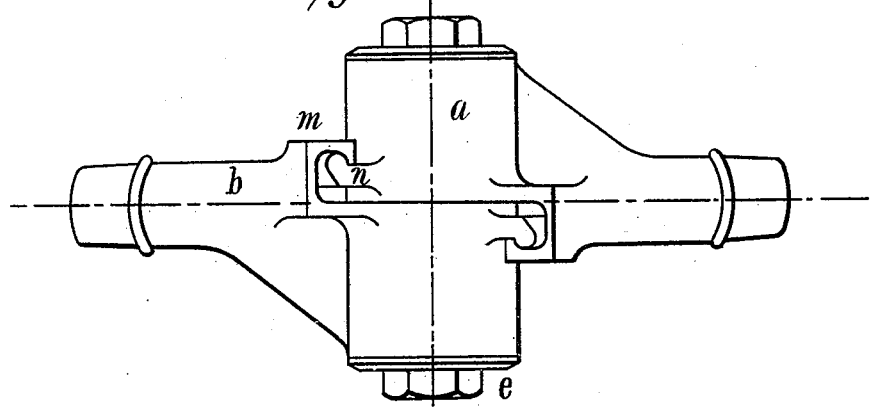
Fig. 2.
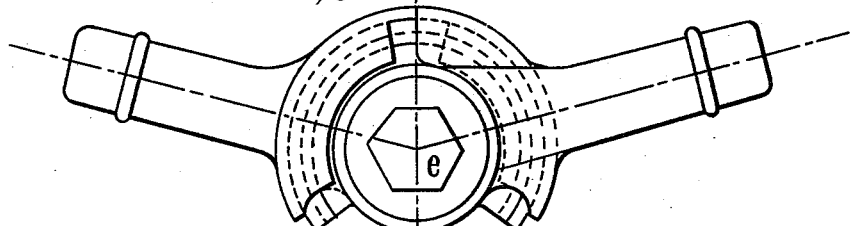
Fig. 16.
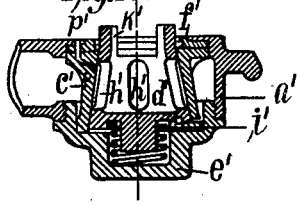
Fig. 14. Fig. 12.
Fig. 17.
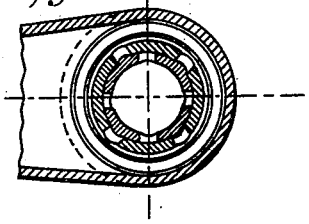
Fig. 15.
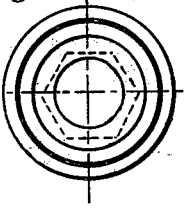
Fig. 13.
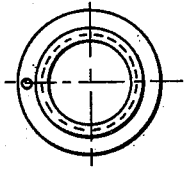
Witnesses
Edgworth Irvine
A. W. Alexander
Inventor
Onesim Ledovsky
By his Attorneys
Alexander & Co.
THE NORRIS PETERS CO., PHOTO-LITHO., WASHINGTON, D. C.

No. 676,564. Patented June 18, 1901.
O. LEDOVSKY.
PIPE COUPLING.
(Application filed Jan. 16, 1901.)
(No Model.) 2 Sheets—Sheet 2.
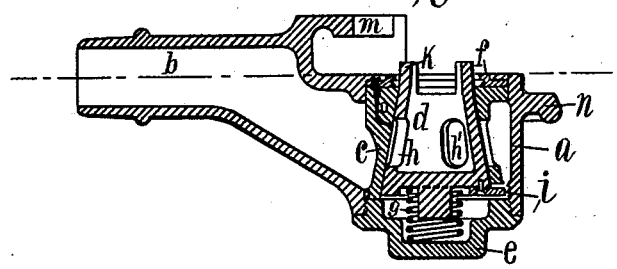
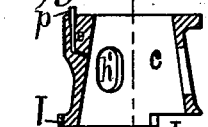
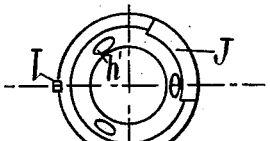
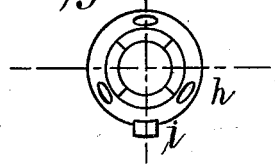
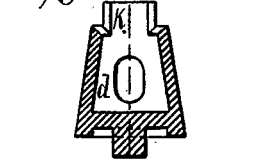
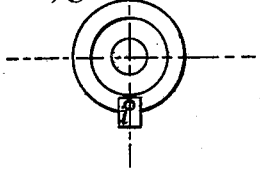

UNITED STATES PATENT OFFICE.

ONESIM LEDOVSKY, OF ST. PETERSBURG, RUSSIA.

PIPE-COUPLING.

SPECIFICATION forming part of Letters Patent No. 676,564, dated June 18, 1901.

Application filed January 16, 1901. Serial No. 43,474. (No model.)

*To all whom it may concern:*

Be it known that I, ONESIM LEDOVSKY, a subject of the Emperor of Russia, and a resident of St. Petersburg, Russia, have invented certain new and useful Improvements in Pipe-Couplings, of which the following is a specification.

The pipe-coupling forming the subject of the present invention is intended to connect the sections of flexible pipes containing gas, liquids, or other fluids the pressure of which may be greater or less than that of the atmosphere. The arrangement is such that when two similar couplings (with one of which each of the two sections of the pipe to be connected is provided) are coupled up uninterrupted communication is established between these sections; but as soon as these two couplings are disconnected, purposely or accidentally, the valves which they contain are automatically closed and prevent all communication between the pipe and the surrounding atmosphere.

In the accompanying drawings, Figure 1 is a side elevation of two pipe-couplings coupled up. Fig. 2 is a corresponding plan. Fig. 3 is a transverse vertical section on the axis of one of the pipe-couplings. Fig. 4 is a plan view of the same. Fig. 5 is a horizontal section of the same. Figs. 6 to 15 are views showing the parts of the coupling separately. Figs. 16 and 17 are respectively a vertical section and a horizontal section of a modified pipe-coupling.

As shown in Fig. 3, the pipe-coupling consists of a cylindrical box or shell $a$, provided with two circular projecting flanges $m$ and $n$, and of a tube $b$, to which the end of the pipe-section intended to be coupled to the corresponding neighboring section may be fixed. The inner portion of the shell $a$ contains a conical socket $c$, serving as a seat for a hollow plug $d$. A cap $e$, screwed to the lower portion of the shell $a$, presses upon the socket $c$ and causes its upper rim to press against a rubber washer $f$, this pressing in its turn against an inner shoulder, with which the upper portion of the shell $a$ is provided. The cap $e$ serves at the same time as an abutment for a spring $g$, which presses the plug $d$ against its socket $c$. When the inside pressure in the pipe is greater than that of the surrounding atmosphere, the strength of the spring $g$ may be very small, because in this case it only serves to support the weight of the plug $d$; but, on the other hand, when the pressure in the pipe is lower than that of the atmosphere the spring $g$ should be sufficiently strong to prevent the plug $d$ from being pressed downward in its socket.

The walls of the plug $d$, which has the shape of a hollow truncated cone closed at the bottom and open at the top, are provided with apertures $h$, arranged at angles of one hundred and twenty degrees from each other, and corresponding apertures $h'$ are provided in the socket $c$. When the couplings are coupled up, these two sets of holes are sixty degrees from one another. The angular displacement of sixty degrees of the plug $d$ with respect to its socket $c$ is limited by a stud $i$, fixed to the lower portion of the plug $d$ and sliding in a groove $j$ in the socket $c$. The upper edge of $d$ has in it two notches diametrically opposite to each other. The portion between the notches form two opposite lugs $k$, of circular shape, which extend each for a quarter of a circle. In order to prevent the socket $c$ from partaking in the rotary movement of the plug $d$, its lower rim is provided with a projection $l$, fitting into a corresponding notch in the shell $a$.

In order to couple up two similar pipe-couplings, they are placed in inverse positions respectively at right angles to each other, as shown in Fig. 10, in such a manner that the flanges $k$ of one of the plugs take into the grooves in the other. One of the pipe-couplings is rotated with respect to the other in the direction indicated by an arrow in Fig. 4 in such a manner that the flanges $m$ $n$ of the two parts engage one under the other until the flanges $m$ of the two parts abut one against the other—that is to say, until the two pipe-couplings are in the position shown in Fig. 2, which corresponds to a relative angular displacement of one hundred and twenty degrees. As the plugs $d$ of both parts owing to the projections $k$ cannot be displaced and as the angle of rotation of the plug $d$ with respect to the socket $c$ is limited to sixty degrees by the stud $i$, it follows that the plugs $d$ will rotate one hundred and twenty degrees divided by two—that is, sixty degrees—with respect to their respective sockets c. The holes h will come, therefore, opposite to the holes h', and uninterrupted communication between the pipes b of the two pipe-couplings will take place through these holes h h' and their hollow plugs d. Moreover, this rotary movement will cause the flanges n to engage under the flanges m. Thus a housing will be formed which will not allow the two parts to move away one from another in the direction of their common axis.

It is to be remarked that when the inside pressure in the pipe is greater than that of the atmosphere the inner edges of the rubber washers f will be pressed one upon the other by the pressure of the fluid which fills the pipes, which will insure tightness of the joint. If, on the contrary, the inside pressure is less than that of the atmosphere, the same object may be attained by giving a suitable shape to the transverse section of the washer f—a Z shape, for example.

In order to take the two pipe-couplings apart, they must be turned one hundred and twenty degrees one on the other in the reverse direction—that is to say, back again into the position shown in Fig. 4. It is clear that this movement will close the apertures h before the flanges m n are disconnected.

When two pipe-couplings the inside pressure in which is greater than that of the atmosphere are taken apart, the elasticity of the fluid remaining in the hollow of the valve will tend to force the two parts apart as soon as the flanges m n are disconnected; but, in the contrary case, when the inside pressure is below that of the atmosphere the outside pressure will tend to oppose the separation of the parts. In order to avoid this, the socket c is provided with a small lateral hole o, which causes the interior of the cock to communicate by means of a tube p with the surrounding atmosphere as soon as the apertures h are closed.

The angle of displacement of the plug d depends upon the number of the apertures h h'. Figs. 16 and 17 show a pipe-coupling in which the socket and the plug have each four apertures. In order to couple up two similar couplings, it is sufficient to turn them ninety degrees only with respect to each other instead of one hundred and twenty degrees. These figures further show a slightly-modified construction of the cap e, which allows a less height to be given to the shell a. The immovability of the plug c' with respect to the shell a' is obtained by means of the tube p', one end of which is fixed in the shell c' and the other passes through the shoulder or upper edge of the shell a'.

I claim as my invention—

1. In pipe-couplings the combination with coupling-halves of hollow plugs provided with openings at a distance from each other equal to a double angle of rotation of the coupling-halves, the plugs engaging in each other by means of lugs k and their rotation being limited by studs i fixed in the plugs and located in grooves j arranged in the sockets c.

2. In pipe-coupling the combination with a hollow plug of a vent or channel o for equalizing the pressure inside and outside the coupling.

In witness whereof I have hereunto set my hand in presence of two witnesses.

ONESIM LEDOVSKY.

Witnesses:
N. TSCHEKALOFF,
Z. BLAW.